United States Patent
Bugwadia et al.

(10) Patent No.: US 6,229,570 B1
(45) Date of Patent: May 8, 2001

(54) MOTION COMPENSATION IMAGE INTERPOLATION—FRAME RATE CONVERSION FOR HDTV

(75) Inventors: Kobad Bugwadia, Sterling, VA (US); Eric D. Petajan, Watchung; Narindra N. Puri, Monmouth Junction, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/161,337

(22) Filed: Sep. 25, 1998

(51) Int. Cl.$^7$ .................................................. H04N 7/01
(52) U.S. Cl. ................ 348/441; 348/699; 348/416.1; 348/445; 348/459; 375/240.16
(58) Field of Search .................... 348/441, 445, 348/446, 443, 451, 452, 459, 699, 700, 416.1; 375/240.16, 240.17; 382/236, 238; 386/111; H04N 7/01, 11/20

(56) References Cited

U.S. PATENT DOCUMENTS

| | | | |
|---|---|---|---|
| 5,473,381 | * 12/1995 | Lee | 348/441 |
| 5,508,747 | * 4/1996 | Lee | 348/451 |
| 5,600,377 | * 2/1997 | David et al. | 348/452 |
| 5,666,164 | * 9/1997 | Kondo et al. | 348/441 |
| 5,742,348 | * 4/1998 | Kuwahara et al. | 348/441 |
| 5,796,437 | * 8/1998 | Muraji et al. | 348/452 |
| 5,835,150 | * 11/1998 | Choi | 348/441 |
| 5,844,616 | * 12/1998 | Collet et al. | 348/441 |
| 5,886,745 | * 3/1999 | Muraji et al. | 348/448 |
| 5,940,132 | * 8/1999 | Kondo et al. | 348/441 |
| 6,069,664 | * 5/2000 | Zhu et al. | 348/441 |
| 6,128,047 | * 10/2000 | Chang et al. | 348/699 |

* cited by examiner

Primary Examiner—Reinhard Eisenzopf
Assistant Examiner—Jean W. Désir

(57) ABSTRACT

A process for up-converting an existing video source signal having a low frequency (frames/second) to a high frequency signal for use with High Definition Television (HDTV). The process samples the existing frames in the existing video signal and calculates integer displacements of pels within the existing frames. A polynomial curve fit is then performed on the displacements to obtain estimates of horizontal and vertical displacements of each block in each existing frame. Based on the alignment of the blocks within a sampling grid on each frame, the blocks are segregated into groups. The block groups are then used to interpolate missing or required frames of the high frequency signal in a piecemeal manner by utilizing blocks of a particular block group to estimate a corresponding block in a frame of the high frequency signal.

24 Claims, 3 Drawing Sheets

MOTION COMPENSATION IMAGE INTERPOLATION— FRAME RATE CONVERSION FOR HDTV

BACKGROUND OF THE INVENTION

I. Field of the Invention

The present invention relates to the processing of source video signals for use with high definition televisions (HDTV). More particularly, the present invention pertains to a method of converting an existing source video signal to a signal having an increased frequency rate (number of frames per second) for use with HDTV.

II. Description of the Related Art

Presently available source material like motion-picture film is recorded at a temporal rate of 24 frames/second and video source material is recorded at a rate of 30 frames/second. This temporal rate of 24 or 30 Hz is too low and causes detrimental motion artifacts during camera panning, especially with large screen viewing. In addition, the Grand Alliance High-Definition Television (GA-HDTV) system developed for the United States can provide a video rate of 60 Hz or frames per second. Thus, a frame rate-up conversion from 24/30 Hz to 60 Hz is needed for utilizing information such as motion-picture films as a high quality source for HDTV.

Motion information is necessary for a high quality frame rate conversion. Known techniques such as frame repetition or linear interpolation do not suffice for conversion of data having high spatial resolution as in the case of HDTV. Although many motion compensated video coding techniques are presently known, the motion information required for frame rate conversion is not the same as that required for video coding. High quality frame rate conversion requires motion estimation that more closely reflects the true physical motion of a moving object in a video sequence.

Recently, many motion compensated frame/field conversion techniques have also become known. Techniques such as hierarchical block matching are used to generate displacement vectors that more closely reflect the true motion of the displaced objects in a video sequence, and a motion compensated filter (spatio-temporal filter) is utilized to reconstruct the continuous spatio-temporal signal. However, since some level of aliasing is always present in the sampled or scanned video signal, perfect reconstruction of the continuous spatio-temporal signal is not always possible through the use of such a motion-compensated reconstruction filter.

In addition, these known techniques for performing motion-compensated frame/field rate conversion have in general been proposed for implementation at the receiver. As the price of a receiver is sensitive to the chip count and memory, such receiver-enabled techniques are in practice limited to using only the neighboring frames relative to the subject frame for interpolation and, thus, do not have the benefit of using other frames which are prior and subsequent in time to the subject frame.

SUMMARY OF THE INVENTION

In accordance with the present invention, a process is disclosed for increasing the resolution of an existing video signal having a frame rate of 24 or 30 frames/second to a higher rate, such as 60 or 72 frames/second, for use with HDTV. The process interpolates, from the existing source sequence of frames, missing frames to generate the higher frequency signal by utilizing existing frames which are prior in time to a subject (interpolated) frame and subsequent in time to the subject frame.

The inventive process includes sampling the existing video frame sequence for a select number of times and increasing the sampling resolution by performing linear spatial interpolation of the sampled video signal. Shifts between picture elements (pels) in the frames of the video signal are then estimated from the increased resolution video signal and displacement vectors are constructed and plotted from the picture element shifts. Once the displacement vectors are plotted, a polynomial curve fit is performed and pel shifts are estimated therefrom. Utilizing the pel shifts and estimated pel shifts, the frames of the existing video signal are divided into groups based on the sharing of common sampling grids. In other words, frames having common sampling grids are grouped together. The required frames for the high resolution signal are then interpolated using frames within a corresponding group of frames.

For an existing video signal containing motion of objects, the process is performed by first dividing each frame into blocks of pixels and performing a hierarchical block matching technique on the blocks of each frame with respect to other frames in the sequence of existing frames to produce integer displacement vectors for each block in each frame. The integer displacement vectors are then calculated at ½ pel accuracy and a polynomial curve fit is performed for providing estimated displacements (vertical and horizontal) of each block at missing values of time, i.e. at time values for which a new frame is to be interpolated for use in the higher resolution HDTV signal. The blocks from each group are then divided into groups based on a common sampling grid criteria, and the missing or needed frames are interpolated piecemeal, one block at a time, using blocks within corresponding groups relative to the subject block for the interpolated frame.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PRESENTLY PREFERRED EMBODIMENTS

The inventive technique utilizes motion information in conjunction with information about sampling grids of digitized available frames from an existing low frame rate video signal (e.g. a 24 Hz signal) to generate a higher rate signal (e.g., 60 Hz or 72 Hz) for use with high definition television (HDTV), or other such applications. The inventive technique will, by way of illustrative example, first be described for converting a video signal representing a panning of a static scene, and will then be described for converting a video signal containing moving objects within a scene.

Static Scene

Given a 24/30 Hz digitized video frame sequence, missing additional frames must be created to generate high quality 60 Hz source material for HDTV. Thus, the basic problem is to perform a frame rate up-conversion from 24/30 to 60 Hz. However, perfect reconstruction of the continuous spatio-temporal signal is not always possible using a motion-compensated reconstruction filter as is known in the art. The present invention accordingly interpolates the missing frames directly without the need to reconstruct the continuous spatio-temporal signal. Information obtained from two-dimensional sampling grids of the available digitized frames, in addition to the motion information, is used to perform the required interpolation.

Figure 1:
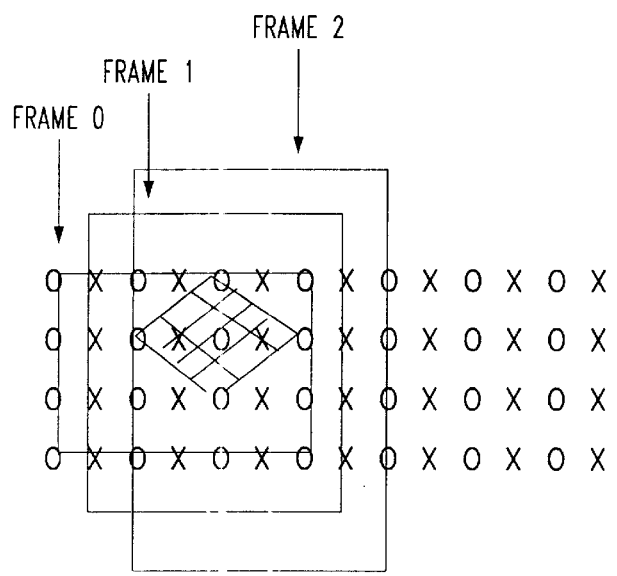
FIG. 1 depicts a representation of panning of a video signal.

By way of example, and with reference to FIG. 1, while a video camera pans from right to left across a static scene, frames 0 and 2 are sampled at locations denoted by o's while frame 1 is sampled at locations denoted by x's. Therefore, for the given sequential frames 0, 1 and 2, two different possible 2-D sampling grids are present, each represented by o's and x's, respectively. Frames 0 and 2 are said to have the same sampling grid. If frame 2 were now missing, the pets in the first column of frame 2 could be reconstructed using the corresponding pel values from the second column of frame 0. However, these pels along the first column of frame 2 are not present in the available frame 1 and, hence, frame 1 should not be used to reconstruct the missing frame 2. Similarly, the shaded patch in frame 2 (shown in FIG. 1 lies) on the same sampling grid within frame 0 and, hence, the corresponding pets from frame 0 are used for interpolation.

Thus, as seen from FIG. 1, since all of the available frames in a given 24/30 Hz digitized sequence do not necessarily share the same sampling grid, the present invention is used to interpolate the pets of a missing frame by using only the corresponding pets from the other available frames lying on the same sampling grid. Moreover, as the inventive process will be employed by a transmitter as opposed to a receiver, memory constraints are not a concern and video frames other than the neighboring frames can be used. Accordingly, a frame further back or forward in the sampled video sequence may be used to interpolate the missing frames.

The steps of the inventive process will now be described in connection with a video signal representing the panning of a static scene, i.e. a scene without any in-scene motion.

Step 1: The total number of sampling locations or positions to be present in the given sequence of existing frames in each of the two dimensions (horizontal (x) and vertical (y)) is set at a finite even number (n). The total number of unique sampling grids selected to be present will therefore be n for a 1-D panning sequence (the sampling points in the other dimension being the same for all of the frames), and will be $n^2$ for a 2-D panning sequence of a static scene. By way of example, let N=8 for a 1-D pan and N=4 for a 2-D pan.

Step 2: Linear spatial interpolation is then performed on the given image sequence for a number of times equal to $\log_2 n$ (n is an even number). This increases the sampling resolutions by a factor of n and is performed both in the horizontal and vertical directions for representing both a 1-D and a 2-D pan.

Step 3: Once Step 2 is performed to generate a new sequence of frames, the integer pel-shifts between the available frames of the new sequence are obtained. As the given sequence is that of a static scene, any numerous block matching techniques as are known in the art can be used to estimate the pel-shifts between the available frames. For example, displacement between two available frames may be obtained by matching a rectangular measurement window in one of the frames with a corresponding measurement window within a search area placed in another frame. The match is achieved by a full search within the given search area using a Minimum Absolute Difference (MAD) matching criterion, as known by those having ordinary skill in the art. The reliability of the displacement estimate depends on the chosen size of the measurement window in conjunction with the present amount of motion. However, if a small window is used and the displacement is large, the estimate will not be accurate. The smaller the measurement window, the higher the probability that there are blocks in the corresponding search area containing a very similar or identical pattern of picture elements. Moreover, since the displacement vector field for all pels within the measurement window for a static scene remains constant, a sufficiently large measurement window of a static scene should be used.

Step 4: Divide the pel-shifts between the available frames, as obtained from Step 3, by n. This calculation provides the estimated pel-shifts between the available frames of the original sequence with a 1/n pel accuracy. Vectors $S_x$ and $S_y$ are then constructed to represent the estimated displacements, in the horizontal and vertical directions, respectively, of the available frames with respect to the first available frame in the given sequence. If the vector $t_1$ represents the time corresponding to the temporal sampling of the available frames, and the first available frame in the given sequence is assumed to be sampled at time t=0, then for a 30 Hz sequence the vector $t_1$=[0 2/60 4/60 6/60].

Figure 2:
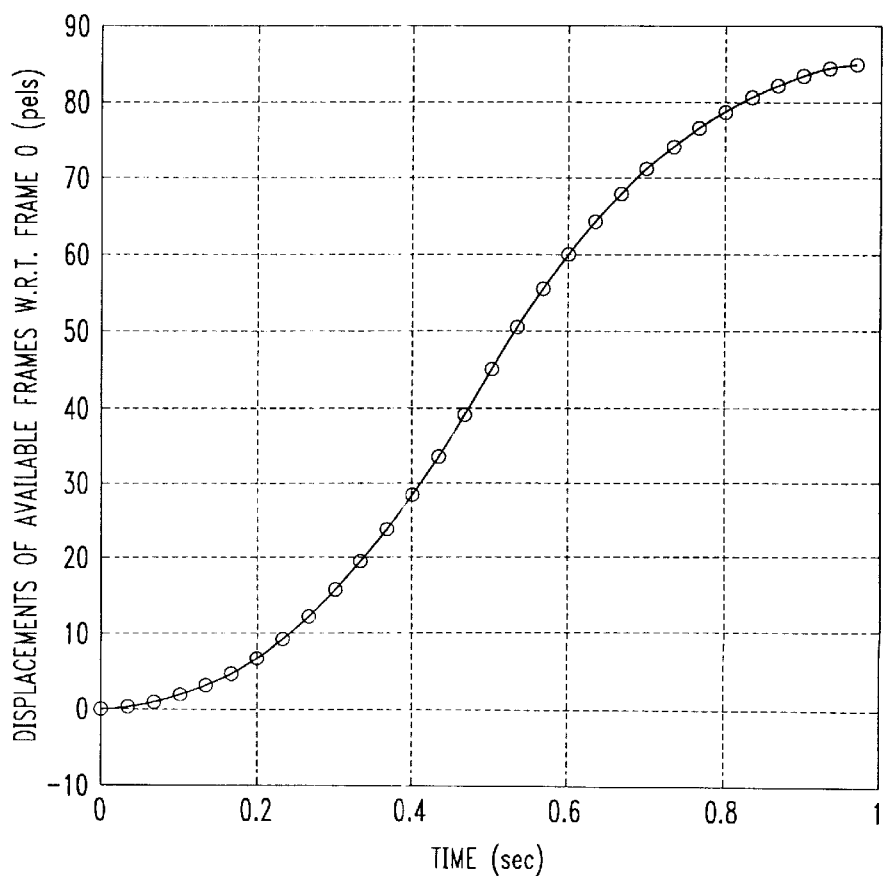
FIG. 2 illustrates a polynomial curve fit of picture element displacement values.

Step 5: The data in each of the vectors $S_x$ and $S_y$ versus the values in the time vector $t_1$ is then plotted and the inertia of physical motion is modeled by performing a polynomial curve fit of the known displacements to obtain displacement estimates for the missing frames. A polynomial curve fit provides a smooth transition between the available and interpolated frames. Polynomials $P_x$ and $P_y$ of smallest degree p and q, respectively, are found to fit the known points in each of the two plots. These polynomials can then be represented as $P_x(t)=a_0+a_1 t+a_2 t^2+ \ldots +a_p t^p$ and $P_y(t)= b_0+b_1 t+b_2 t^2+ \ldots +b_q t^q$ where $P_x(t)$ and $P_y(t)$ are the best polynomial fit of the pel-shifts of the known frames in the horizontal and vertical directions. An example of a polynomial curve fit is shown in FIG. 2 for n=4. The o's in the graph represent the estimated displacements of the available frames in a given 30 Hz sequence with respect to the first available frame, referred to as frame 0. A polynomial of degree 13 has been used to obtain the best polynomial fit of these known displacement estimates (denoted by o's).

Step 6: The pel-shifts in the horizontal and vertical directions at the missing values of time from $P_x(t)$ and $P_y(t)$ respectively are then estimated. The missing values of time correspond to those instances at which the missing frames need to be interpolated. For a 30 Hz to 60 Hz frame rate conversion, the pel-shifts at times represented by the values of vector $t_1$ are known and the missing pel-shift values are at time instances represented by the vector $t_2$=[1/60 3/60 5/60]. Substituting each of the values of vector $t_2$ in the polynomials $P_x(t)$ and $P_y(t)$, the pel-shifts for the missing frames can be obtained in the horizontal and vertical directions.

Step 7: From steps 4 and 6, the pel-shifts with a 1/n pel accuracy in both the horizontal and vertical direction of the available frames as well as the frames that need to be interpolated are known. Using this information, the frames are segregated into groups such that each group consists of frames having the same sampling grid. Grouping among the frames is done by using the fact that the pel shifts between any two frames in both the horizontal and vertical directions in the same group should be an integer value. Therefore, if n is selected to be equal to 4 the total number of resulting groups would be 4 for a 1-D pan and 16 for a 2-D pan.

Step 8: The missing frames can now be interpolated from the available frames within its same group. Whenever possible, both forward and backward frames, relative to the frame that needs to be interpolated, should be used. In this manner, new information that is not present in a backward frame, such as boundary information, can be obtained from a forward frame, while information lost in a forward frame (e.g. boundary information) is available in a backward frame. Also, picture elements that are present in both forward and backward frames needs to be constructed in a missing frame by averaging. Thus, by using the multiple information that is available, the effects of noise and motion blur can be decreased.

For an image sequence of a 1-D right pan of a static scene, C represents a missing frame in the sequence that needs to be interpolated, A represents a backward frame and B represents a forward frame, relative to the position of frame C Frames A and B are both available and have the same sampling grid as frame C. The monochrome intensity of the pels in each of the frames A, B and C are stored in 2-D arrays a, b and c, respectively. If X1 is the estimated pel-shift between the frames A and C and X2 is the estimated pel-shift between the frames C and B, then the pels in frame C can be reconstructed as described by the following criterion:
for(l=0, l<X2; l++)
for (m=0; m<ROW; m++)
c[m][l]=a[m][l+X1]
for (l=X2; l<COL-X1; l++)
for (m=0; m<ROW; m++)
c[m][l]=round((a[m][l+X1]+b[m][l]-X2)/2.0)
for (l=COL-X1; l<COL; l++)
for (m=0; m<ROW; m++)
c[m][l]=b[m][l-X2]
where ROW×COL is the dimension of the 2-D arrays containing the monochrome intensity of the pels in each of the frames A, B and C, i.e. the spatial resolution of the frames in the given image sequence.

We now consider an image sequence of a 2-D pan of a stationary scene, whereas before A and B represent the available frames and C represents a missing frame between A and B to be interpolated. Frames A, B and C have been found to have the same sampling grid. Let X1, Y1 and X2, Y2 be the estimated horizontal and vertical pel-shifts between the frames A and C and frames C and B, respectively. For a 2-D pan, frame C has been shifted both in the horizontal as well as the vertical directions with respect to frame A by the estimated amounts X1 and Y1, respectively. The estimated value of X1 from the proposed algorithm will be a positive value for a horizontal shift towards the right and a negative value for a shift towards the left. Similarly, if the vertical displacement of frame C is in the downward direction with respect to frame A, then the estimated value of Y1 will be positive; otherwise, it will be negative. Assuming that the estimated values of X1, Y1, X2 and Y2 have all been found to be positive values, then the pels in frame C can be reconstructed as follows:
for (m=0; m<ROW-Y1; m++)
for (l=0; l<COL-X1; l++)
c[m][l]=a[m+Y1][l+X1]
for (m=y2; m<ROW; m++)
for (l=X2; l<COL; l++)
c[m][l]=b[m-Y2][l-X2]
for (m=y2; m<ROW-Y1; m++)
for (l-X2; l<COL-X1; l++)
c[m][l]=round ((a[m+Y1][l+X1]+b[m-Y2][l-X2])/2.0)
where ROW×COL is the spatial resolution of the frames in the given image sequence. These routines can easily be modified for other combinations in the values of X1, Y1, X2 and Y2. At those spatial positions in frame C at which the monochrome intensity is not found from the above routines, a spatial interpolation using its neighboring reconstructed pels is performed.

Non-Static Scene

A non-static scene contains, from frame to frame, different objects that may be moving by different amounts in different directions. Unlike static scenes, the displacement vector field for all pels within an available frame will not be the same. Therefore, each frame needs to be segmented into different regions and each region within the frame must be treated separately. A different displacement vector needs to be estimated for each region within the is same frame, assuming that all pels within the selected region are displaced by the same amount. Thus, the procedure described above for a static scene is applied separately to each of the regions within the same frame. The missing frames are interpolated piecewise, one missing region within the frame at a time, using corresponding regions lying on the same sampling grid from the other available frames. Again, as memory constraints do not exist because the inventive method is not receiver implemented, the corresponding region may also be selected from a frame further back or forward in the sampled video sequence.

Step 1: Select n, the total number of sampling points to be present in the given sequence in each of the two dimensions.

Step 2: Perform linear spatial interpolation on the given image sequence to double both the horizontal and vertical sampling resolution of the image sequence.

Step 3: Using the new sequence generated in Step 2, perform hierarchical block matching to estimate the integer displacements of each block within the available frames. Therefore, each of the regions within the segmented frame will be considered to be in the shape of a rectangular block. Although various hierarchical block matching techniques may be employed, as known by those having ordinary skill in the art, the presently preferred technique is described below.

Block matching is a widely used displacement estimation method that can be easily implemented in hardware. However, the estimate tends to be unreliable if small measurement windows are used and the displacement is large. On the other hand, the estimate becomes inaccurate if large measurement windows are used and the displacement vector field inside the large windows is not constant. In order to take into account these two conflicting requirements, what is needed is a hierarchical structure that uses distinct sizes of measurement windows at different levels of the hierarchy. The preferred block matching procedure assigns a highest level to large measurement windows. From one level to the next level of the hierarchy, the size of the measurement windows is decreased. The displacement estimate is obtained recursively, i.e. at each level of the hierarchy the resulting estimate from a prior level is used as an initial estimate for the next lower level. Using a hierarchical block matching technique yields reliable and homogeneous displacement vector fields which are close to the true displacements rather than only a minimum mean absolute difference. Hence, hierarchical block matching is used to estimate the displacement vector fields in the given video sequence.

An available frame from the new sequence is first selected and divided into rectangular blocks. Hierarchical block matching is then performed to estimate the integer displacement of each of these blocks in the other available frames. At each level of the hierarchy, a displacement vector is obtained by matching a rectangular measurement window in the selected frame with a corresponding measurement window within a search area placed in each of the other frames. The match is achieved by a full search within the given search area using the Minimum Absolute Difference (MAD) matching criterion.

Step 4: Divide the obtained integer displacements for each block in the selected frame within the other available frames by 2. The resulting values then represent, at half-pel accuracy, the motion estimates for each block in the selected frame within the other available frames of the original sequence obtained by hierarchical block matching.

Step 5: Find the best polynomial fit of the displacements (in both the horizontal and vertical directions) of each block in the selected frame within the other available frames. This step is similar to Step 5 as described above in conjunction with a static scene.

Step 6: Using these polynomials, estimate the horizontal and vertical displacements of each block (of the selected frame) at the missing values of time. The missing values of time correspond to those instances at which the missing frames need to be interpolated.

Step 7: From Steps 4 and 6, the estimated displacements of each block (in the selected frame) within the available as well as the missing frames are known. Using this information, divide each block in the selected frame and its corresponding matches in the other (available as well as the missing) frames into 4 groups, such that all the blocks within the same group lie on the same sampling grid. Grouping among the blocks is performed by using the fact that both the horizontal and vertical displacement between any two blocks in the same group should be an integer value.

Step 8: Interpolate the missing frames block-wise, one missing block within the frame at a time, using corresponding blocks lying on the same sampling grid in the other available frames. The preferred interpolation technique to be used is described below.

Generally, for a given video sequence, a forward frame will have new boundary information that is not present in a backward frame, while other boundary information present in a backward frame is lost in a forward frame. Hence, both the first and last available frames in a segment of the given sequence are divided into rectangular blocks. Hierarchical block matching is then performed to estimate the integer displacement of each of the blocks in the first available frame within the other available forward frames, and each of the blocks in the last available frame within the other available backward frames.

Figure 3A:
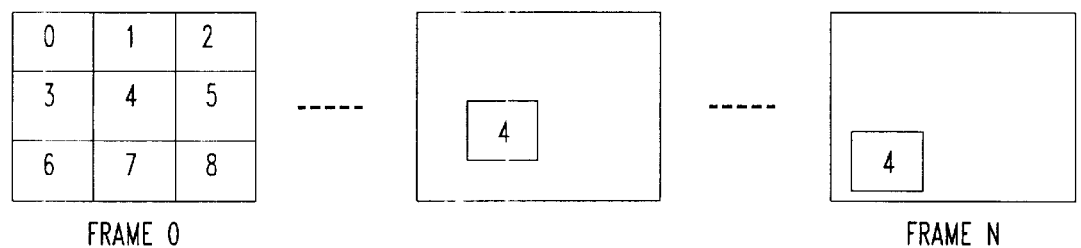
FIGS. 3a and 3b depict a segment of an image sequence showing an example of the block interpolation step of the present invention.
Figure 3B:
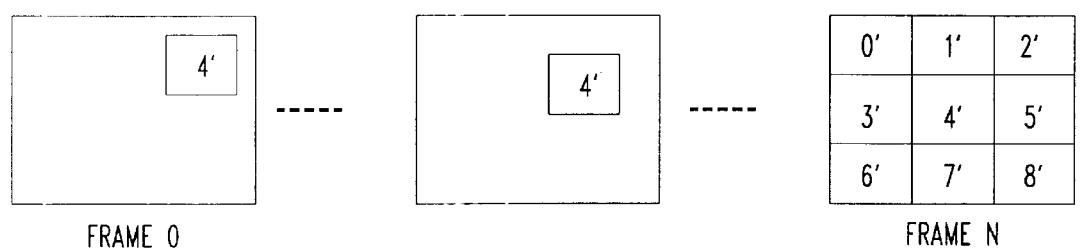

By way of example, consider a segment of an image sequence from 1-D right panning of a non-static scene as shown in FIGS. 3(a) and 3(b). In this case, all or some of the pels in the blocks 0, 3 and 6 in frame 0 are not present in each of the forward frames. This results in a significantly higher Minimum Absolute Difference (MAD) obtained for searches of blocks 0, 3 and 6 of frame 0 in each of the forward frames than the MADs obtained for corresponding searches of blocks 0', 3' and 6' of frame N in the backward frames. Similarly, all or some of the pels in blocks 2', 5' and 8' in frame N are not present in each of the backward frames and results in a higher MAD value for searches of these blocks in the backward frames. Thus, the displacements of blocks 0, 3 and 6 from frame 0 and blocks 2', 5', and 8' from frame N will not be estimated within the missing frames and these blocks should not be used for interpolating the missing frames. 2'

Hence, for a subsection of a given video sequence as shown in FIGS. 3(a) and 3(b), depending on the type of pan, some blocks on the boundaries of frames 0 and N will generally not be used in the interpolation process. Also, those blocks from either frames 0 or N whose searches in the other available frames result in a high MAD value above a certain selected threshold are not used. The displacements of the remaining blocks from both frames 0 and N within the missing frames are estimated. The missing frames are then interpolated one block at a time, using corresponding blocks lying on the same sampling grid from the other available By frames. Each block contains different objects with different shapes and boundaries that may be displaced by differing amounts. Hence, all of the blocks in a missing frame are not constructed by using corresponding blocks from the same available frame.

Figure 4:
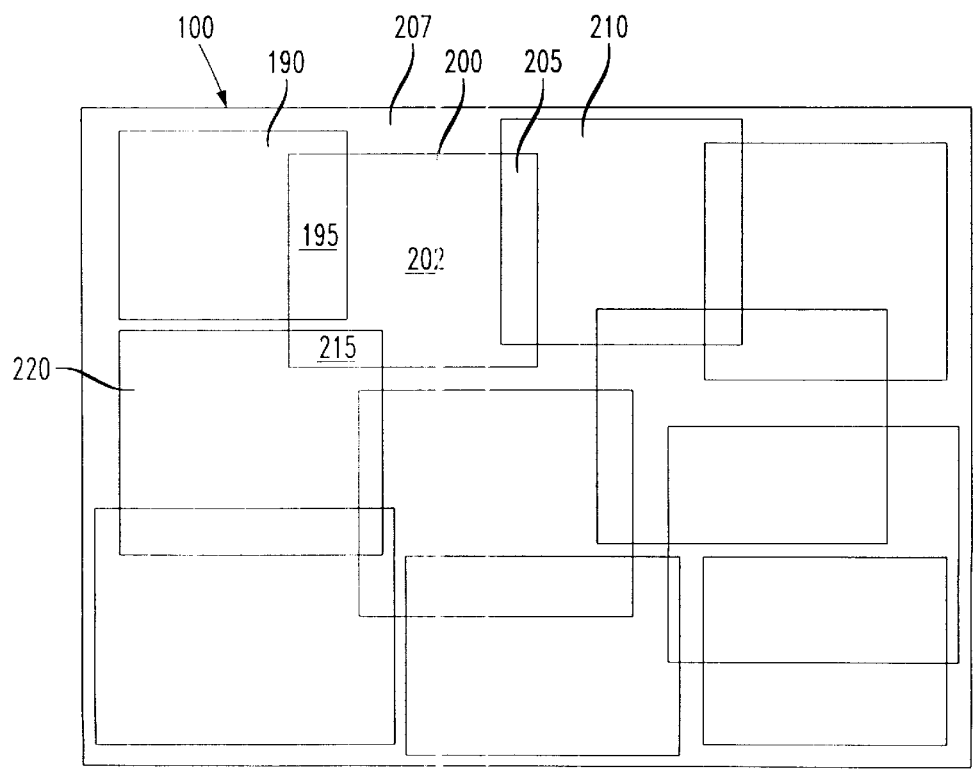
FIG. 4 depicts a block-wise reconstruction of a missing frame using rectangular-shaped blocks, n accordance with the present invention.

The block-wise reconstruction process for a missing frame is shown in FIG. 4. Pel values in regions within the missing frames that result from the overlap of neighboring blocks are obtained by averaging the corresponding pel values from those blocks. At those spatial locations in the missing frames at which the pel values are not obtained from the above process, the values of the corresponding pels from the previous, available frame are repeated.

For example, and with continued reference to FIG. 4, numerous blocks are overlaid on an existing frame 100 which may be prior or subsequent to the subject (to-be-interpolated) block. With regard to block 200, this block forms an overlap region 195 with block 190, an overlap region 205 with block 210 and an overlap region 215 with block 220. Region 202 of block 200 does not overlay a neighboring block and, thus, overlays the existing frame. Thus, pel values of region 202 will be assigned the same values as the pels located in the overlapped region from the existing frame. As for region 207, there is no overlap region with any surrounding block and, therefore, the pel values from an interpolated frame in the location of region 207 will have the same value as region 207, i.e. the pel values are repeated. Lastly, the pel values in the overlapped regions, e.g. 215, are averaged between the values in that region from block 200 and 220.

A typical block or patch of the scene will have been sampled with multiple sampling grids over a number of frames through time. Since the displacement of each sampling grid is know from the polynomial displacement function for the given patch (Step 6), they may be used to increase the spatial resolution of the patch for a given frame. For example, the spatial resolution may be doubled by the following copy operations:

a. Take pixels with even column and row numbers (in the upconverted patch) from the integer-pel horizontal and vertical displacement patches;

b. Take pixels with odd column and row numbers from the half-pel horizontal and vertical displacement patches;

c. Take pixels with even column and odd row numbers from the integer-pel horizontal and half-pel vertical displacement patches, respectively; and d. Take pixels with odd column and even row numbers from the half-pel horizontal and integer-pel vertical displacement patches respectively.

In general, the highest practical spatial upconversion factor will depend on the number of different fractional-pel displaced patches available for a given patch of scene. For example in one dimension, if patches are available at 0, ¼, ½, and ¾, the spatial resolution may be increase four times in the given dimension. The number of available sampling grids depends on the speed and direction of pans of the scene. Noise can also be reduced from blocks or patches of scene by averaging two or more patches with the same sampling grid.

Non-Static Scene With 3-D Motion Estimation

The hierarchical block matching techniques described above are used to estimate the displacements of the moving objects in the image sequence. Hierarchical block matching yields reliable and homogeneous displacement vector fields which are close to the true displacements. However, hierarchical block matching adopts a motion model that describes the motion of image objects by the translational motion of 2-D blocks and is, therefore, generally limited to estimating for only the true 2-D translatory motion. Hence, this motion models described above are insufficient to represent the real 3-D world.

Block matching can be regarded as a method that applies spatial transformation on the blocks of the image. By generalizing this transformation, a motion model based on affine transformation to better approximate motion field of a 3-D moving rigid object and linear deformation such as zooming will be used for motion estimation. Let (x, y) and (x', y') be the image-space coordinates of two frames at times $t_1$ and $t_2$, respectively. Let the geometric relationship between these 2 frames be defined by the transformation functions x'=f(x, y) and y'=g(z, y). Then for block matching the transformation functions for the pixels in the ith block of the image are:

$$f(x,y)=x+u_1$$

$$g(x,y)=y+V_i$$

where ($u_i$, $v_i$) is the estimated motion vector of the ith block. Now, for affine transformation the transformation functions for the pixels included in the ith patch of the image are:

$$f(x, y)=a_{i1}x+a_{i2}y+a_{i3}$$

$$g(x, y)=a_{i4}x+a_{i5}y+a_{i6}$$

where $a_{i1}-a_{i6}$ are the 6 motion parameters of the patch. Since there are 6 degrees of freedom in this transformation, the parameters can be determined from motion vectors of 3 vertices. Therefore, the patches of this transformation are triangles. Using mathematical motion models, it has been theoretically shown that the discontinuities in the estimated motion field do not always occur along the boundaries of the blocks or patches. Thus, to maintain a reasonable level of computational complexity we adopt the continuous method with no discontinuities allowed in the estimated motion field along the boundaries of the patches.

The motion compensated frame rate upconversion technique based on the affine transformation motion model will now be described.

Step 1: Select n, the total number of sampling points to be present in the given sequence in each of the two dimensions. To maintain a reasonable level of complexity we choose n=2.

Step 2: Perform linear spatial interpolation on the given image sequence to double both its horizontal and vertical sampling resolution.

Step 3: Apply the affine transformation motion model on the new sequence generated in Step 2 to estimate the integral displacements of each pel within the available frames.

The affine motion estimation is used for scaling, rotation and sheer motion and computes the displacements of each pel within each triangular-shaped block. The motion estimation scheme based on the affine transformation motion model is described below.

a: Select an available frame from the new sequence and segment the selected frame (image) into triangular blocks or patches.

b: Estimate the motion vectors of the 3 vertices of each of the triangular patches (in the selected frame) within the other available frames. A 3-level hierarchical block matching with each vertex placed in the centered spatial position of the measurement windows is used. The match is achieved by a full search within the given search area using the MAD matching criterion.

c: Compute the motion parameters ($a_{i1}-a_{i6}$) for each patch (in the selected frame) within the other available frames by solving a set of linear equations.

d: Compute the displacements for each pel inside each of the patches (in the selected frame) within the other available frames using the corresponding transformation functions f(x, y) and g(x, y) for each patch.

Step 4: Divide the obtained integral displacements for each pel in the selected frame within the other available frames by 2. These are now the motion estimates for each pel in the selected frame within the other available frames of the original sequence at half-pel accuracy.

Step 5: Find the best polynomial fits of the displacements (in both the horizontal and vertical directions) of each pel in the selected frame within the other available frames.

Step 6: Using these polynomials, estimate the horizontal and vertical displacements of each pel (of the selected frame) at the missing values of time. The missing values of time corresponds to those instances at which the missing frames need to be interpolated.

Step 7: From steps 4 and 6, the estimated displacements of each pel (in the selected frame) within the available as well as the missing frames are known. Using this information, divide each pel in the selected frame and its corresponding matches in the other (available as well as the missing) frames into 4 groups, such that all the pels within the same group lie on the same sampling grid. Grouping among the pels is done by using the fact that both the horizontal and vertical displacement between any two pels in the same group should be an integer value.

Step 8: Interpolate the missing frames pel-wise, one missing pel within the frame at a time, using corresponding pels from available frames of the original sequence lying on the same sampling grid. The interpolation technique to be used is described below.

Figure 5A:
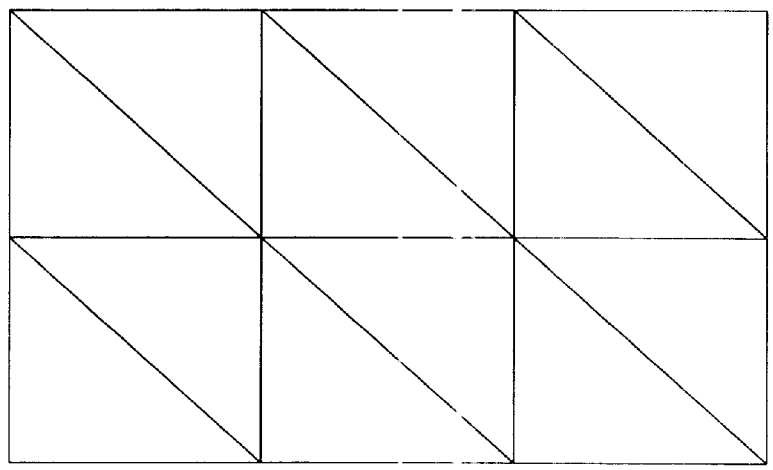
FIGS. 5(a) and 5(b) depict block-wise reconstruction of a missing frame containing 3-dimensional motion, using rectangular-shaped blocks in accordance with the present invention.
Figure 5B:
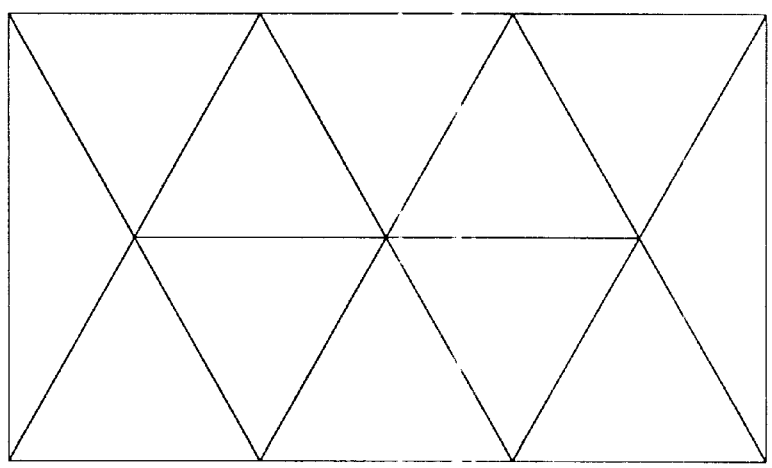

The first and the last available frames in a segment of the given sequence are divided into triangular patches as shown in FIGS. 5(a) and 5(b). Two possible triangular patch structures are shown. Patches of equilateral triangles have been shown to yield the best performance in terms of minimizing the structural error caused by not allowing any discontinuities in the estimated motion field along the boundaries of the patches . Hence, both the first and the last available frames in a segment of the given sequence will be divided into approximately equilateral triangular patches as shown in FIG. 5(b). The motion model is then applied to estimate the integral displacements of each pel in the first available frame within the other available forward frames and each pel in the last available frame within the other available backward frames. Pels within triangular patches whose vertex search in the other available frames yields a higher MAD value above a certain selected threshold will not be used in the interpolation process. The displacements of the remaining pels (both from the first and the last available frames in a segment of the given sequence) within the missing frames will be estimated. The missing frames will then be interpolated one pel at a time using corresponding pels lying on the same sampling grid from the other available frames. All the pels in a missing frame are not necessarily constructed by using corresponding pels from the same available frame. At those spatial locations in the missing frames where the pel values are not obtained from the above process, the values of the corresponding pels from the previous available frame are repeated.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. A method of converting a frame rate of an existing video signal having a sampling resolution to a higher frame rate video signal, the existing video signal having a sequence of successive-in-time video frames each containing an amount of pels having pel values, comprising the steps of:
   (a) defining a number (n) of sampling locations to be present in a given sequence of the successive-in-time video frames of the existing video signal, wherein n is an even number;
   (b) increasing the sampling resolution of the existing video signal by performing linear spatial interpolation on an image sequence represented by the successive-in-time video frames of the existing video signal for a number of times to form a high resolution sequence of frames having a number of available frames;
   (c) estimating integer pel-shift values from the high resolution sequence of available frames;
   (d) constructing vectors $S_x$ and $S_y$ representing estimated pel value displacements at a time value (t) in a first time vector ($t_1$) of available frames with respect to a first available frame in the high resolution sequence of available frames, wherein vector $S_x$ represents horizontal displacement pel values and vector $S_y$ represents vertical displacement pel values;
   (e) performing a polynomial curve fit of the values of vectors $S_x$ and $S_y$ for each value in time vector $t_1$ to obtain a motion estimate of an image represented by the sequence of available frames;
   (f) estimating, based upon the polynomial curve fit, pel shift values for the horizontal and vertical directions at time values corresponding to times at which interpolated frames are to be used to form the higher frame rate video signal;
   (g) segregating the frames of the existing signal into groups utilizing the estimated displacements of available frames from said step (d) and the pel shift values from said step (f) so that frames sharing common sampling grids are grouped together; and
   (h) interpolating, based upon at least one of the groups of frames of the existing signal, one or more new frames for use in the higher frame rate video signal.

2. The method of claim 1, wherein said step (c) is performed by utilizing a block matching technique to measure displacement between two available frames by matching a rectangular measurement window in one frame with a corresponding measurement window of a search area contained in another frame, and wherein a match is achieved by conducting a search within the search area using a Minimum Absolute Difference (MAD) matching criterion.

3. The method of claim 1, wherein the polynomial curve fit for vector $S_x$ of said step (e) is represented as $P_x(t)=a_0+a_1t+a_2t^2+ \ldots +a_pt^p$, wherein p is the smallest degree which is the best polynomial curve fit of the horizontal pet shift values of the sequence of available frames with respect to a first frame in the sequence of available frames, and wherein the polynomial curve fit for vector $S_y$ of step (e) is represented as $P_y(t)=b_0+b_1t+b_2t^2+ \ldots +b_qt^q$, wherein q is the smallest degree which is the best polynomial curve fit of the vertical pet shift values of the sequence of available frames with respect to the first frame in the sequence of available frames.

4. The method of claim 1, wherein said step (g) of segregating frames is performed by measuring pel shifts in the vertical and horizontal directions between any two frames and grouping frames into a common group based on an integer value of the measured pet shifts.

5. The method of claim 1, wherein said step (h) of interpolating is performed by utilizing frames prior-in-time to a subject frame and subsequent-in-time to the subject frame.

6. A method of converting a frame rate of an existing video signal having a sampling resolution to a higher frame rate video signal, the existing video signal having a sequence of successive-in-time video frames representing a video scene having motion and each containing an amount of (pels) having pel values, comprising the steps of:
   (a) dividing each frame of the existing video signal into blocks and defining a number (n) of sampling locations in a given sequence of the successive-intime video frames of the existing video signal, wherein n is an even number;
   (b) increasing the sampling resolution of the existing video signal by performing linear spatial interpolation on an image sequence represented by the successive-in-time video frames of the existing video signal for a number of times equal to $\log_2 n$ to form a high resolution sequence of frames having a number of available frames;
   (c) estimating, for each block of the existing video signal, integer pel-shift values from the high resolution sequence of available frames;
   (d) constructing vectors $S_x$ and $S_y$ representing estimated pel value displacements at a time value (t) in a first time vector ($t_1$) of available frames with respect to a first available frame in the high resolution sequence of available frames, wherein vector $S_x$ represents horizontal displacement pel values and vector $S_y$ represents vertical displacement pel values;
   (e) performing a polynomial curve fit of the values of vectors $S_x$ and $S_y$ for each block and for each value in time vector $t_1$ to obtain, for each block, a motion estimate of an image represented by the sequence of available frames;
   (f) estimating, based upon the polynomial curve fit, pel shift values for the horizontal and vertical displacements at time values corresponding to times at which interpolated frames are to be used to form the higher frame rate video signal;

(g) segregating each block of each of the frames of the existing signal into groups utilizing the estimated displacements of available blocks from said step (d) and the pel shift values from said step (f) so that blocks sharing common sampling grids are grouped together; and (h) interpolating, based upon at least one of the estimated displacements of step (f) and from at least one of the common sampling grid block groups, one or more new blocks for use in constructing one or more new frames for the higher frame rate video signal.

7. The method of claim 6, wherein the polynomial curve fit for vector $S_x$ of said step (e) is represented as $P_x(t)=a_0+a_1t+a_2t^2+\ldots+a_pt^p$, wherein p is the smallest degree, which is the best polynomial curve fit of the horizontal pel shift values of the sequence of available frames with respect to a first frame in the sequence of available frames, and wherein the polynomial curve fit for vector $S_y$ of step (e) is represented as $P_y(t)=b_{0+b_1}t+b_2t^2+\ldots+b_qt^q$, wherein q is the smallest degree which is the best polynomial curve fit of the vertical pel shift values of the sequence of available frames with respect to the first frame in the sequence of available frames.

8. The method of claim 6, wherein said step (g) of segregating blocks is performed by measuring pel shifts in the vertical and horizontal directions between any two blocks and grouping blocks into a common group based on an integer value of the measured pel shifts.

9. The method of claim 6, wherein said step (h) of interpolating is performed by utilizing blocks prior-in-time to a subject block and subsequent-in-time to the subject block.

10. The method of claim 9, wherein said step (h) of interpolating further comprises overlaying an existing frame with blocks of a common groups so that the existing frame is partially covered with the overlaid blocks and so that regions of some of the blocks overlap with each other, and assigning values to pets of a subject block based on the average pel values between the pels forming the overlaid regions.

11. The method of claim 6, further comprising the step of utilizing the motion estimates of each block derived from step (e) to increase the spatial resolution of said new frames.

12. The method of claim 11, further comprising the step of reducing noise in said new frames by averaging blocks having a common sampling grid.

13. A method of converting a frame rate of an existing video signal depicting three-dimensional motion and a sampling resolution to a higher frame rate video signal, the existing video signal having a sequence of successive-in-time available video frames representing a video scene having three-dimensional motion and each containing an amount of pels having pel values, comprising the steps of:

(a) selecting a total number of sampling points to be present in the existing image sequence for a vertical direction and a horizontal direction;

(b) performing linear spatial interpolation on the existing image sequence for expanding a sampling resolution by an amount (k) in both the horizontal direction and the vertical direction to generate an expanded image sequence;

(c) estimating integer displacements for each pel within frames of the expanded image sequence generated in step (b);

(d) selecting a frame of the expanded image sequence which lies within the sequence of successive-in-time available video frames, and dividing the estimated integer displacements for each pel in the selected frame by the amount (k) for generating motion estimates for each pel in the selected frame within the available frames of the original sequence;

(e) performing polynomial fits of the displacements in both a horizontal and a vertical direction for each pel in the selected frame within the other available frames;

(f) using the polynomial fits from step (e), estimating horizontal and vertical displacements of each pel of the selected frame at missing values of time corresponding to instances at which interpolation of missing frames is to be used to form the higher rate video signal;

(g) utilizing the estimated displacements of each pel from step (f), segregating the pels in the selected frame and pels from available and missing frames corresponding to the pels in the selected frame into groups, such that pels within the same group lie within the same sampling grid; and (h) interpolating pel values of the missing frames based on corresponding pel values from available frames of the original sequence lying within the same sampling grid.

14. The method of claim 13, wherein step (c) is performed by:

selecting an available frame from the new sequence and segmenting the selected frame into triangular-shaped blocks, each having three vertices;

estimating motion vectors of the three vertices of each of the triangular blocks within the other available frames;

computing motion parameters for each block within the other available frames by solving a set of linear equations; and computing the displacements for each pel inside each of the patches within the other available frames using the corresponding transformation functions f(x, y) and g(x, y) for each patch.

15. An apparatus for converting a frame rate of an existing video signal having a sampling resolution to a higher frame rate video signal, the existing video signal having a sequence of successive-in-time video frames each containing an amount of pels having pel values, said apparatus comprising:

means for defining a number (n) of sampling locations to be present in a given sequence of the successive-in-time video frames of the existing video signal, wherein n is an even number;

means for increasing the sampling resolution of the existing video signal by performing linear spatial interpolation on an image sequence represented by the successive-in-time video frames of the existing video signal for a number of times to form a high resolution sequence of frames having a number of available frames;

first means for estimating integer pel-shift values from the high resolution sequence of available frames;

means for constructing vectors $S_x$ and $S_y$ representing estimated pel value displacements at a time value (t) in a first time vector ($t_1$) of available frames with respect to a first available frame in the high resolution sequence of available frames, wherein vector $S_x$ represents horizontal displacement pel values and vector $S_y$ represents vertical displacement pel values;

means for performing a polynomial curve fit of the values of vectors $S_x$ and $S_y$ for each value in time vector $t_1$ to obtain a motion estimate of an image represented by the sequence of available frames;

second means for estimating, based upon the polynomial curve fit, pel shift values for the horizontal and vertical directions at time values corresponding to times at which interpolated frames are to be used to form the higher frame rate video signal;

means for segregating the frames of the existing signal into groups utilizing the estimated displacements of available frames and the pel shift values so that frames sharing common sampling grids are grouped together; and means for interpolating, based upon at least one of the groups of frames of the existing signal, one or more new frames for use in the higher frame rate video signal.

16. The apparatus of claim 15, wherein said first estimating means utilizes a block matching technique to measure displacement between two available frames by matching a rectangular measurement window in one frame with a corresponding measurement window of a search area contained in another frame, and wherein a match is achieved by conducting a search within the search area using a Minimum Absolute Difference (MAD) matching criterion.

17. The apparatus of claim 15, wherein said second estimating means uses a polynomial curve fit for vector $S_x$ represented as $P_x(t)=a_0+a_1t+a_2t^2+ \ldots +a_pt^p$, wherein p is the smallest degree which is the best polynomial curve fit of the horizontal pel shift values of the sequence of available frames with respect to a first frame in the sequence of available frames, and wherein the polynomial curve fit for vector $S_y$ is represented as $P_y(t)=b_0+b_1t+b_2t^2+ \ldots +b_qt^q$, wherein q is the smallest degree which is the best polynomial curve fit of the vertical pel shift values of the sequence of available frames with respect to the first frame in the sequence of available frames.

18. The apparatus of claim 15, wherein said segregating means measures pel shifts in the vertical and horizontal directions between any two frames and groups frames into a common group based on an integer value of the measured pel shifts.

19. The apparatus of claim 15, wherein said interpolating means utilizes frames prior-in-time to a subject frame and subsequent-in-time to the subject frame.

20. An apparatus for converting a frame rate of an existing video signal having a sampling resolution to a higher frame rate video signal, the existing video signal having a sequence of successive-in-time video frames representing a video scene having motion and each containing an amount of (pels) having pel values, said apparatus comprising:

means for dividing each frame of the existing video signal into blocks and defining a number (n) of sampling locations in a given sequence of the successive-in-time video frames of the existing video signal, wherein n is an even number;

means for increasing the sampling resolution of the existing video signal by performing linear spatial interpolation on an image sequence represented by the successive-in-time video frames of the existing video signal for a number of times equal to $\log_2 n$ to form a high resolution sequence of frames having a number of available frames;

first means for estimating, for each block of the existing video signal, integer pel-shift values from the high resolution sequence of available frames;

means for constructing vectors $S_x$ and $S_y$ representing estimated pel value displacements at a time value (t) in a first time vector ($t_1$) of available frames with respect to a first available frame in the high resolution sequence of available frames, wherein vector $S_x$ represents horizontal displacement pel values and vector $S_y$ represents vertical displacement pel values;

means for performing a polynomial curve fit of the values of vectors $S_x$ and $S_y$ for each block and for each value in time vector $t_1$ to obtain, for each block, a motion estimate of an image represented by the sequence of available frames;

second means for estimating, based upon the polynomial curve fit, pel shift values for the horizontal and vertical displacements at time values corresponding to times at which interpolated frames are to be used to form the higher frame rate video signal;

means for segregating each block of each of the frames of the existing signal into groups utilizing the estimated displacements of available blocks and the pel shift values so that blocks sharing common sampling grids are grouped together; and means for interpolating, based upon at least one of the estimated displacements and from at least one of the common sampling grid block groups, one or more new blocks for use in constructing one or more new frames for the higher frame rate video signal.

21. The apparatus of claim 20, wherein said segregating means measures pel shifts in the vertical and horizontal directions between any two blocks and grouping blocks into a common group based on an integer value of the measured pel shifts.

22. The apparatus of claim 20, wherein said interpolating means utilizes blocks prior-in-time to a subject block and subsequent-in-time to the subject block.

23. The apparatus of claim 22, wherein said interpolating means further comprises means for overlaying an existing frame with blocks of a common group so that the existing frame is partially covered with the overlaid blocks and so that regions of some of the blocks overlap with each other, and means for assigning values to pels of a subject block based on the average pel values between the pels forming the overlaid regions.

24. An apparatus for converting a frame rate of an existing video signal depicting three-dimensional motion and a sampling resolution to a higher frame rate video signal, the existing video signal having a sequence of successive-in-time available video frames representing a video scene having three-dimensional motion and each containing an amount of pels having pel values, said apparatus comprising:

means for selecting a total number of sampling points to be present in the existing image sequence for a vertical direction and a horizontal direction;

means for performing linear spatial interpolation on the existing image sequence for expanding a sampling resolution by an amount (k) in both the horizontal direction and the vertical direction to generate an expanded image sequence;

means for estimating integer displacements for each pel within frames of the expanded image sequence;

means for selecting a frame of the expanded image sequence which lies within the sequence of successive-in-time available video frames, and for dividing the estimated integer displacements for each pel in the selected frame by the amount (k) for generating motion estimates for each pel in the selected frame within the available frames of the original sequence;

means for performing polynomial fits of the displacements in both a horizontal and a vertical direction for each pel in the selected frame within the other available frames and for estimating, based on the polynomial fits, horizontal and vertical displacements of each pel of the selected frame at missing values of time corresponding to instances at which interpolation of missing frames is to be used to form the higher rate video signal;

means for segregating, based on the estimated displacements of each pel, the pels in the selected frame and pels from available and missing frames corresponding to the pels in the selected frame into groups, such that pels within the same group lie within the same sampling grid; and means for interpolating pel values of the missing frames based on corresponding pel values from available frames of the original sequence lying within the same sampling grid.

* * * * *